(12) United States Patent
Rajabali et al.

(10) Patent No.: US 7,560,152 B2
(45) Date of Patent: Jul. 14, 2009

(54) JOINING STRUCTURE IN A LAMINATE COMPRISING A LOCAL REINFORCEMENT

(75) Inventors: Faziel Abdoel Rajabali, Alphen aan den Rijn (NL); Willem Jan Nicolaas Ter Steeg, Pulheim (NL)

(73) Assignees: Stork Fokker AESP B.V., Papendrecht (NL); Airbus Deutschland GmbH, Hamburg (DE)

( * ) Notice: Subject to any disclaimer, the term of this patent is extended or adjusted under 35 U.S.C. 154(b) by 274 days.

(21) Appl. No.: 10/575,016

(22) PCT Filed: Oct. 5, 2004

(86) PCT No.: PCT/NL2004/000700

§ 371 (c)(1),
(2), (4) Date: Jun. 21, 2006

(87) PCT Pub. No.: WO2005/032805

PCT Pub. Date: Apr. 14, 2005

(65) Prior Publication Data

US 2007/0042214 A1    Feb. 22, 2007

(30) Foreign Application Priority Data

Oct. 7, 2003    (NL)    .................................... 1024479

(51) Int. Cl.
*B32B 15/08* (2006.01)
(52) U.S. Cl. ........................................ 428/57; 244/131
(58) Field of Classification Search .................. 428/57, 428/635; 244/119, 131
See application file for complete search history.

(56) References Cited

U.S. PATENT DOCUMENTS

2007/0116906 A1 * 5/2007 Roebroeks .................... 428/33

FOREIGN PATENT DOCUMENTS

WO    WO 98/53989    12/1998

* cited by examiner

*Primary Examiner*—Alexander Thomas
(74) *Attorney, Agent, or Firm*—Young & Thompson

(57) ABSTRACT

A joining structure in a laminate includes metal layers as well as at least one adhesive layer which is enclosed by the metal layers, which metal layers each include separate metal-layer parts having a pair of overlapping edges, which pairs of edges are offset with respect to each other and together define a joining region. The laminate includes a section which is of standard construction and a section which contains an additional, internal reinforcing metal layer, the reinforcing metal layer including two reinforcing metal-layers parts with a pair of overlapping edges, the pair of edges being located outside the joining region.

11 Claims, 9 Drawing Sheets

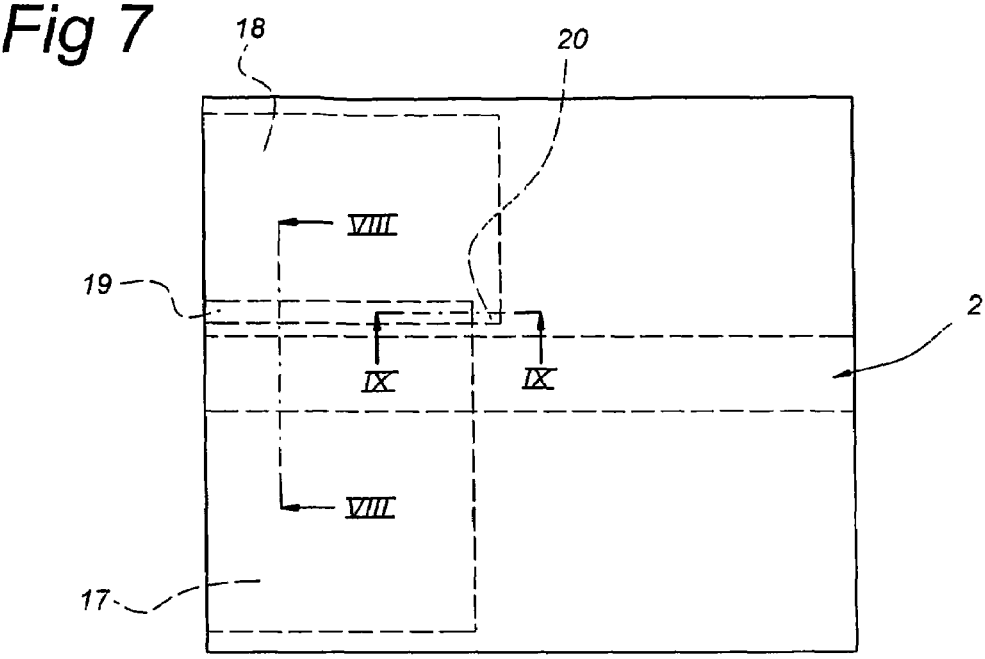
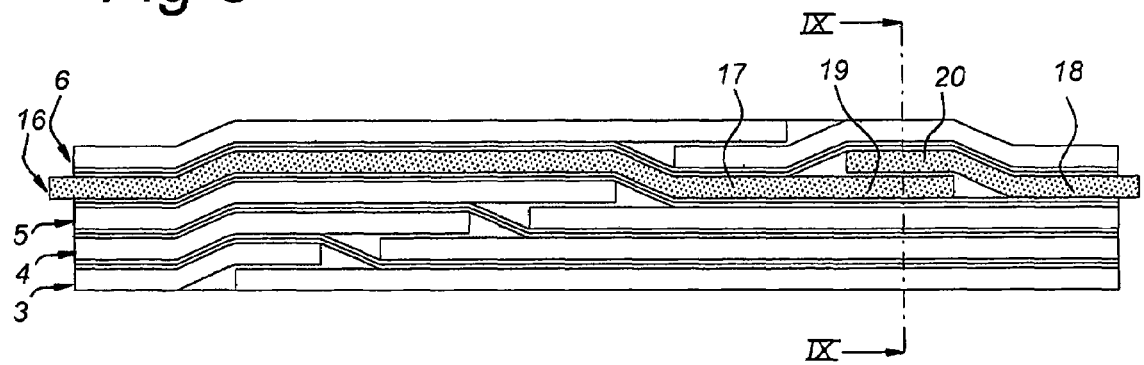
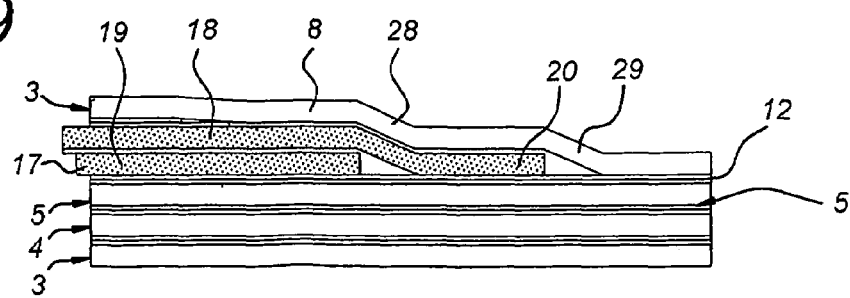

JOINING STRUCTURE IN A LAMINATE COMPRISING A LOCAL REINFORCEMENT

FIELD OF THE INVENTION

The invention relates to a joining structure in a laminate comprising metal layers as well as at least one adhesive layer which is enclosed by the metal layers, which metal layers each comprise separate metal-layer parts having a pair of overlapping edges, which pairs of edges are offset with respect to each other and together define a joining region.

BACKGROUND OF THE INVENTION

A joining structure of this type is known and is found in panels whose width exceeds the width in which the metal layers are produced. Examples of panels of this type which may be mentioned include the skin panels of airplanes, for example those being used for the airplane's fuselage. In an application of this kind, the panels also have to be provided with apertures of a particular size. In this context, in addition to the apertures for windows, it is mainly the relatively large apertures, such as those used for doors and hatches and the like, which are relevant.

In theory, such apertures weaken the panel's supporting function. By applying local reinforcements, it is nevertheless possible to maintain the desired mechanical properties of the panel, such as stiffness and strength. Such reinforcements may be in the form of girders and joists, but in many cases the local reinforcements used are in the form of additional layers in the laminate, in the region of the aperture.

These local reinforcing layers are likewise made from sheet material having a particular maximum width and usually consist of the same material as the metal layers in the remainder of the laminate. The sheet material, which is usually supplied in the form of coils, is directionally sensitive with respect to its mechanical properties as a result of the manufacturing procedure. This directional sensitivity is caused, inter alia, by the direction of the rolling treatment to which the material is subjected. The rolling direction results in a grain orientation in the material.

It is desirable to take the grain orientation into account when manufacturing panels from this type of material, in view of the desired mechanical properties of the said panels. In the present case, this means that the reinforcement layers must have the same grain orientation as the metal layers in the laminate. The result of this is that in panels containing joins, the reinforcing layers must also have joins, since they cannot be provided in the longitudinal direction of the strip transverse to the joining structure, as the grain orientation would then be incorrect. These joins in the reinforcement layers are preferably in close proximity to the joins in the laminate itself.

SUMMARY OF THE INVENTION

It is the object of the invention to provide a joining structure which meets the abovementioned requirements. This object is achieved by the fact that the laminate comprises a section which is of standard construction and a section which contains an additional, internal reinforcing metal layer, said reinforcing metal layer comprising two reinforcing metal-layer parts with a pair of overlapping edges, said pair of edges being located outside the joining region and adjacent thereto.

With the joining construction according to the invention, the standard joining region in the laminate is retained, while a join is nevertheless effected nearby in the reinforcing layer.

These joins may be designed in various ways. Preferably, a metal-layer part of at least one of the metal layers has a joggled edge, in such a manner that the metal-layer parts are substantially in line with one another. This is a standard design for the panel which results in at least one side of the panel being completely flat, which is highly desirable for aerodynamic reasons. In that case, each of the other metal layers as well as the reinforcing metal layer also has a joggled part.

Furthermore, in this case, a reinforcing metal-layer part may be joggled over the joggled edge of the joggled metal-layer part and then be joggled in the opposite direction towards the other, associated metal-layer part. There are two possible variants with this kind of construction, and according to the first variant, the reinforcing metal-layer part is subsequently joggled in the same direction as said joggled edge of the joggled metal-layer part over the other reinforcing metal-layer part.

In this case, a metal-layer part of a further metal layer extends over the portion, joggled in the opposite direction, of the reinforcing metal-layer part to form a spacing between the edge of the metal-layer part and the portion, joggled in the opposite direction, of the reinforcing metal-layer part, in such a manner that the edge of the other metal-layer part of the further metal layer extends as far as the region where this spacing occurs. The other metal-layer part is joggled from that region where this spacing occurs over the edge of the reinforcing metal-layer pair joggled in the same direction and is then joggled in the opposite direction.

According to a second variant of the construction described above, the non-joggled portion of the joggled reinforcing metal-layer part has an edge over which the edge of a further reinforcing metal-layer part extends.

The reinforcing metal-layer forms a relatively large thickening at its overlapping edges in the centre of the laminate. The problem which might occur in this case is that the covering metal layer would have to be given a joggled part of the same magnitude as the thickness of the overlapping edges of the reinforcing metal layer. However, a joggled part of this magnitude is somewhat undesirable, as this might cause porosity, stress concentrations and local delamination. This can be avoided according to the invention if the edges of the reinforcing metal-layer parts, in the direction transverse to the direction in which the edges overlap, are of different sizes in order to provide a stepped joggle arrangement of the metal layer covering the reinforcing metal-layer parts.

BRIEF DESCRIPTION OF THE DRAWINGS

The invention will be explained in more detail below with reference to a number of exemplary embodiments shown in the figures, in which:

FIGS. 7-9, 10-12, 13-15, 16-18, 19-21 and 22-24 show further alternative embodiments.

DETAILED DESCRIPTION OF EMBODIMENTS

Figure 1:
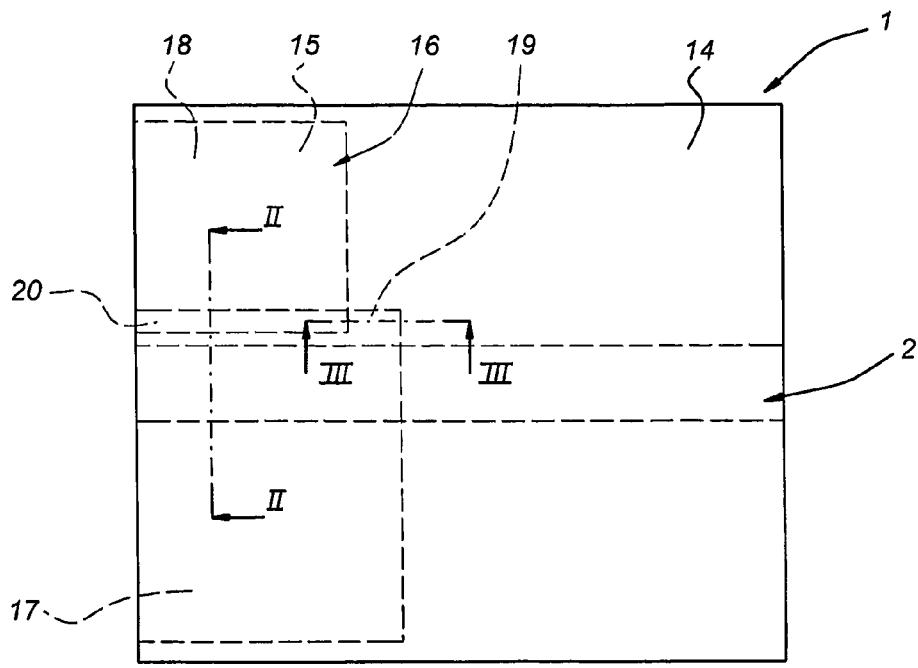
FIG. 1 shows a plan view of a panel with a joining structure according to the invention.

FIG. 1 shows, in plan view, a panel 1 containing a joining structure 2. As shown in the cross section of FIG. 2, the panel consists of a laminate comprising four metal layers 3, 4, 5, 6, each made up of metal-layer parts 7, 8, These metal-layer parts 7, 8 have overlapping edges 9 and 10, respectively, which are fixed to one another by a layer of adhesive 11.

One fiber-reinforced plastic adhesive layer 12 is arranged between in each case two of the metal layers 3 to 6. These fiber-reinforced plastic adhesive layers 12 are continuous and run on at the location of the overlapping edges 9, 10. The remaining spaces are filled with adhesive 13.

As can be seen in the plan view of FIG. 1, the laminate comprises a section 14 of a standard design and a section 15 including an additional reinforcing metal layer 16. This additional reinforcing metal layer 16 comprises two reinforcing metal-layer parts 17, 18 with the respective overlapping edges 19, 20 which are glued together by the layer of adhesive 21.

Figure 2:
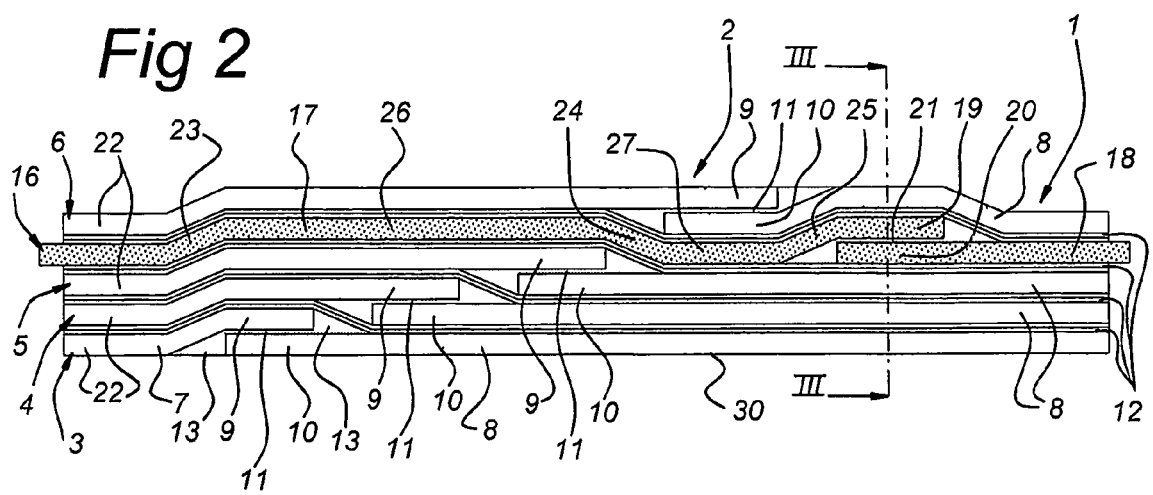
FIG. 2 shows the cross section of the joining structure along II-II.

As can be seen in FIG. 2, these overlapping edges 19, 20 of the reinforcing metal-layer parts 17, 18 which are fastened together are outside the area in which the overlapping edges 9, 10 of all metal-layer parts 7, 8 are fastened together.

Furthermore, it is important that the metal layer parts 7 are provided with a joggled edge 9 in such a manner that the sections 22 are offset with respect to the associated edge 10 of the other metal-layer part 8. This means that one surface 30 of the laminate is flat, which is particularly important in aerodynamic applications of the panel. All metal layers 3, 4, 5 and 6 contain the sections 22.

As illustrated in FIG. 2, the reinforcing metal layer 16, in particular the reinforcing metal-layer part 17 thereof, is provided with a corresponding joggled section 26. The reinforcing metal-layer part 17 then continues over the joggled edge 9 of the metal layer 5, followed by a section which is joggled in the opposite direction in such a manner that the metal-layer part 17 is subsequently glued to the metal-layer part 8 of the metal layer 5 beneath it by means of the respective fiber-reinforced plastic adhesive layer 12 along the section 27. This is then followed by the joggled edge 19 of the reinforcing metal-layer part 17.

As a result of the flanges 24, 25 of the reinforcing metal-layer part 17, a spacing has been created between the upper metal layer 6 and the reinforcing metal-layer part 17. The space which has thus been created contains the edge 10 of the reinforcing metal-layer part 8 of the metal layer 6.

Figure 3:
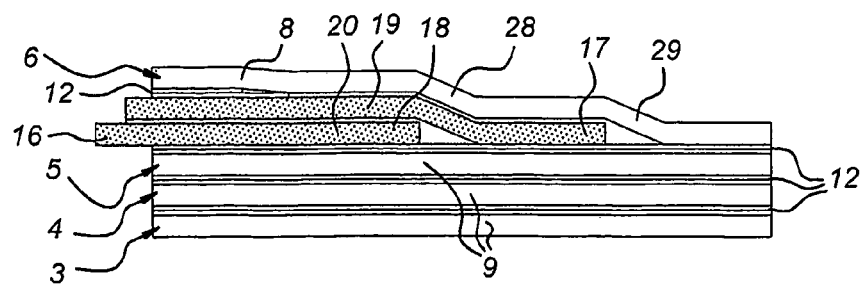
FIG. 3 shows the cross section III-III of FIG. 1 and FIG. 2 of the joining structure.

The cross section III-III of FIGS. 1 and 2, as represented in FIG. 3, shows that the reinforcing metal-layer parts 17, 18 continue for different lengths in the direction parallel with the edges 9, 10 and 19, 20, respectively. The reinforcing metal-layer part 17 extends over the other part 1S and is joggled as far as the metal layer 5 beneath it. This has the advantage that the metal-layer part 8 of the upper metal layer 6 is gradually joggled in two stages 28, 29, so that metal-layer part 8 is not subjected to sudden joggled part of a relatively great magnitude, thus counteracting delamination and porosity.

The joining structure according to the invention can be constructed in many different variants, some of which are illustrated in the FIGS. 4-26, which will be discussed below.

Figure 4:
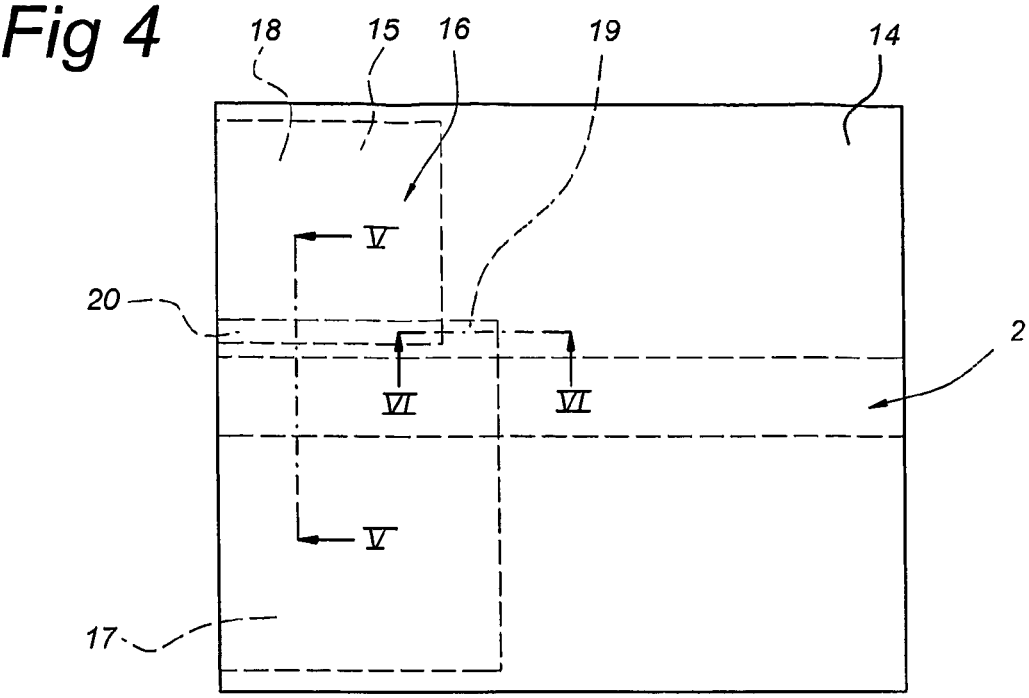
FIGS. 4-6 show alternative embodiments of the joining structure according to FIGS. 1-3.
Figure 5:
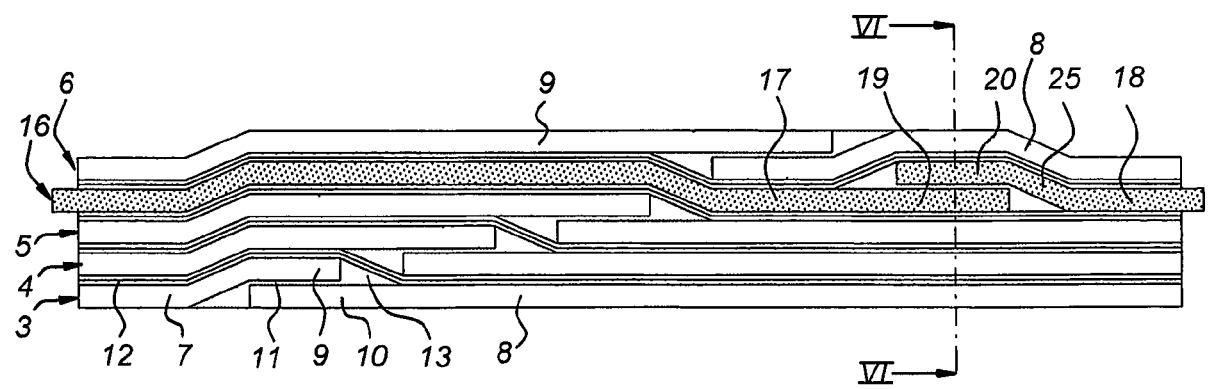
Figure 6:
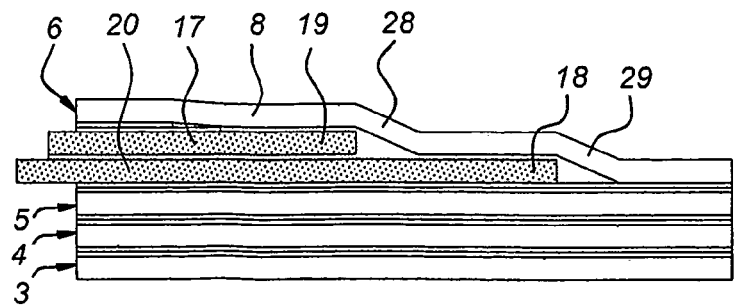

The variant of FIGS. 4-6, which figures show views and cross sections corresponding to those of FIGS. 1-3, is a variant in which, in the cross section V-V, the reinforcing metal-layer 18 has a joggled edge 19, under which the flat overlapping edge of the reinforcing metal-layer part 17 extends. As the reinforcing metal-layer part 17 extends further than the reinforcing metal-layer part 1S, as illustrated in FIG. 4, a step-like sequence of these overlaps has been achieved in cross section VI-VI.

The variant of FIGS. 7-9 is to a large extent identical to that of FIGS. 1-2, except that here the reinforcing metal-layer part 18 extends further than the reinforcing metal-layer part 17, as can be seen in FIG. 7. Reinforcing metal-layer part 17 again has a flat edge 19 like the variant of FIGS. 4-6, whereas the reinforcing metal-layer part 18 has a joggled edge 20. This results in the cross section IX-IX where the reinforcing metal-layer part 18 has been joggled downwards as far as the metal layer 12.

Figure 10:
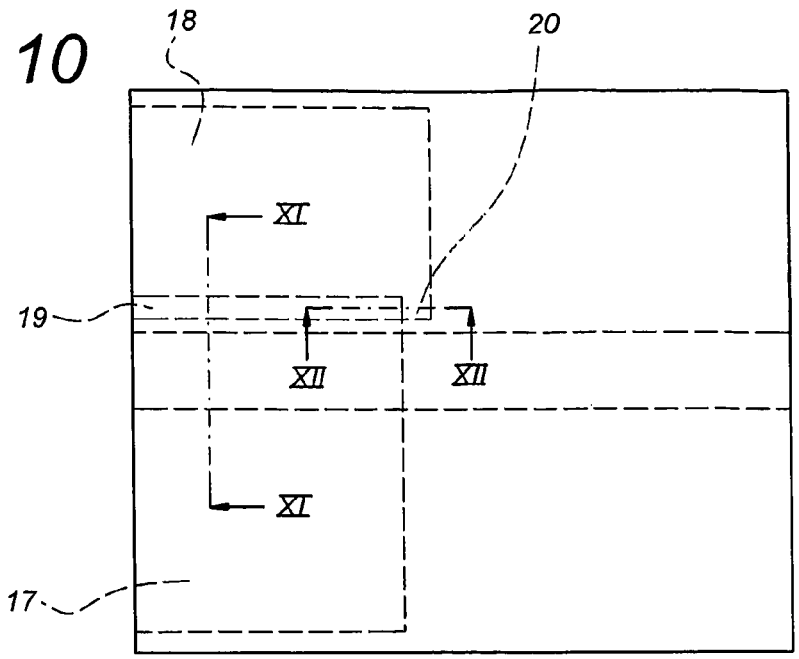
Figure 11:
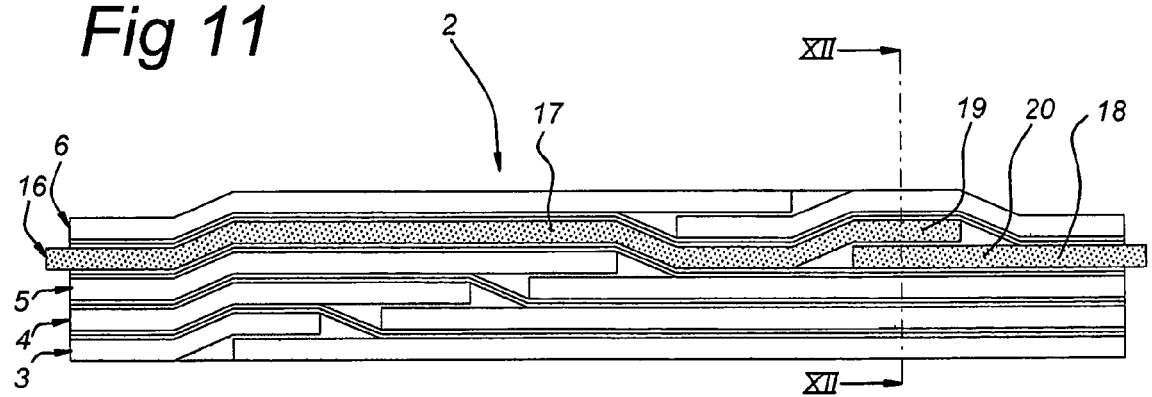
Figure 12:
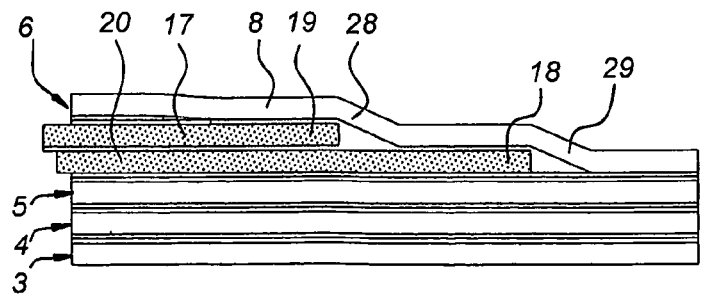

The variant of FIGS. 10-12, which corresponds to a large degree to that of FIGS. 7-9, has a reinforcing metal-layer part 18 with a flat edge 20, whereas the reinforcing metal-layer part 17 in this case has a joggled edge 19. This results in the step-like configuration of the reinforcing metal-layer parts 17, 18 in the cross section XII-XII.

Figure 13:
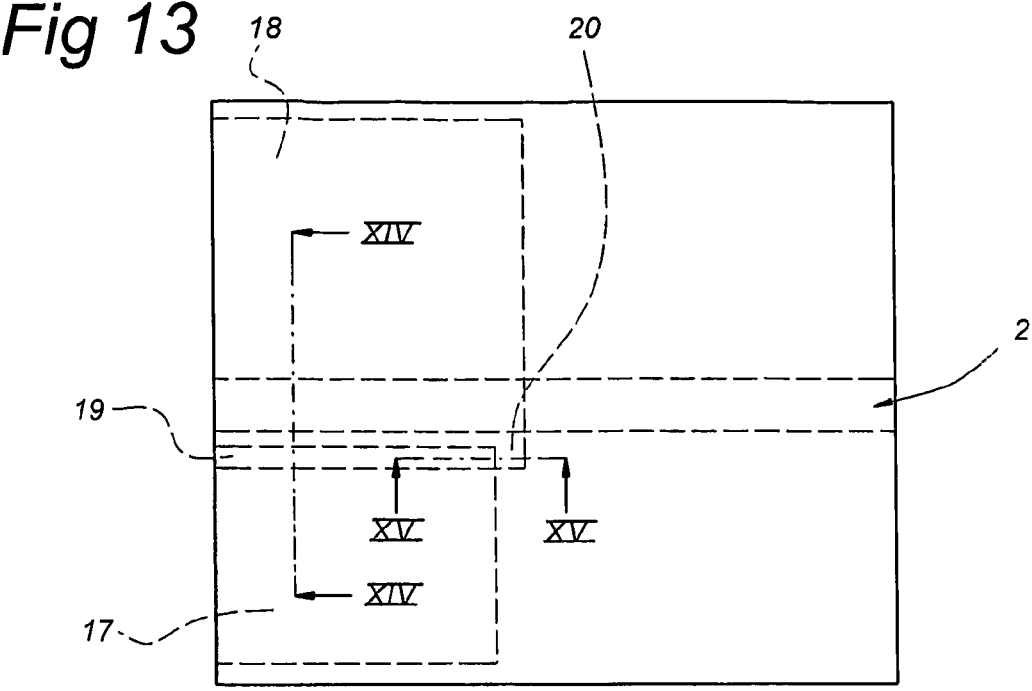
Figure 14:
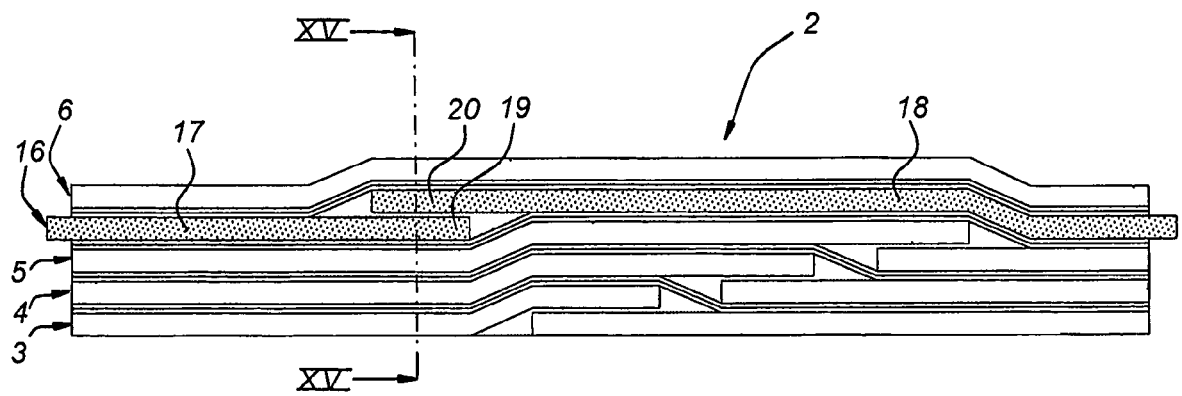
Figure 15:
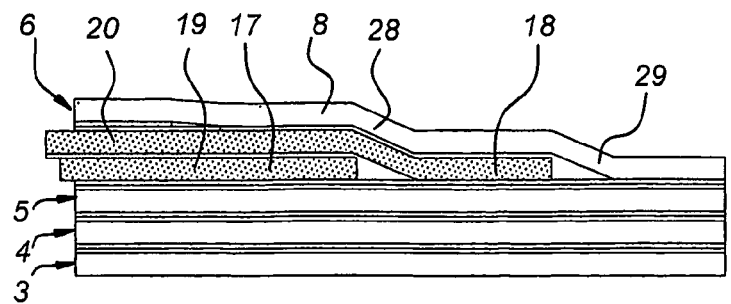

The variant of FIGS. 13-15 differs from the previous variants in the sense that the reinforcing metal-layer part 17 has a flat edge 19, whereas the reinforcing metal-layer part 18 has a relatively long joggled edge 20. Therefore these edges 19, 20 now overlap on the left-hand side of the joining region 2, rather than on the right-hand side of this joining region 2 according to FIGS. 1-12 (as illustrated in FIGS. 2, 5, 8, 11 and 14, respectively).

Figure 16:
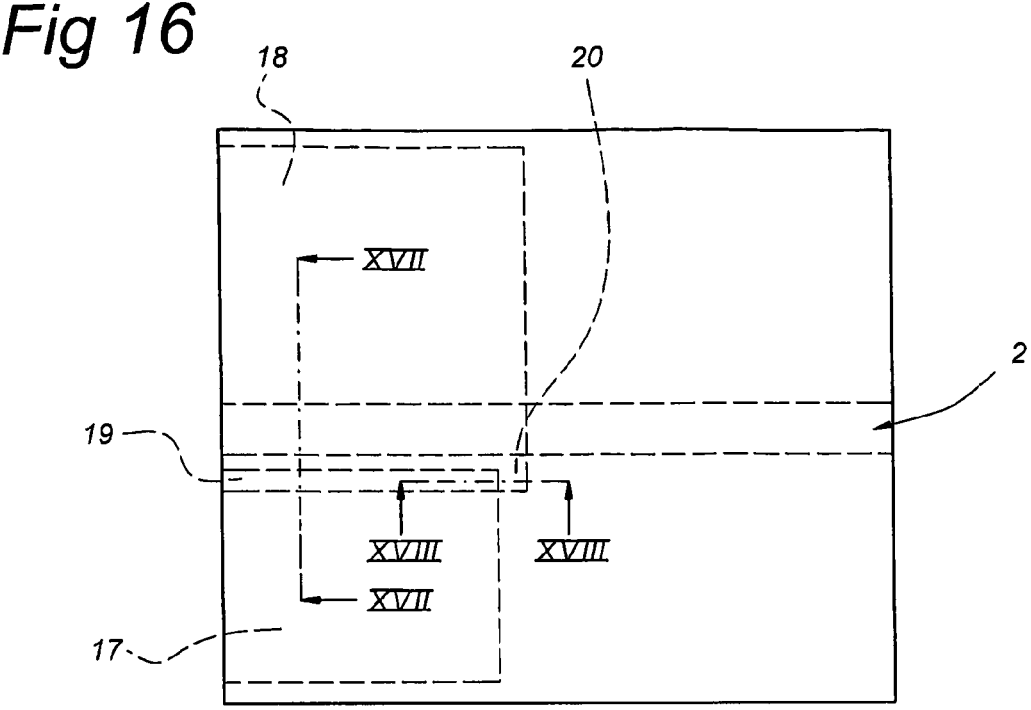
Figure 17:
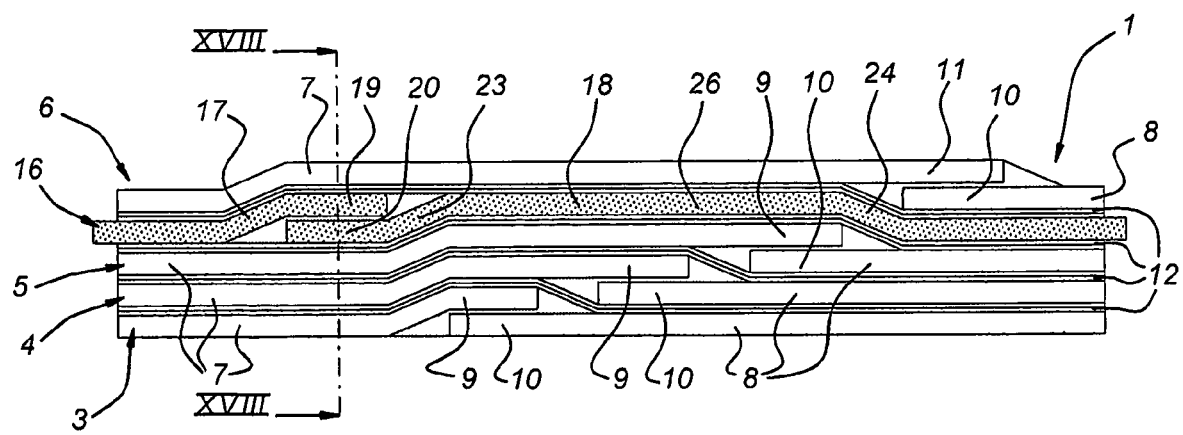
Figure 18:
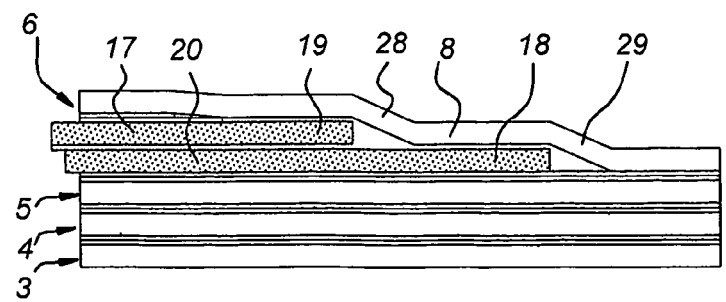

In the variant of FIGS. 16-18, the reinforcing metal-layer part 18 is joggled over the joggled edge 9 of the metal layer 5 at 23 and is followed by a joggled portion 26 which is glued to the metal layer 6, in particular the metal-layer part 7 thereof. The reinforcing metal-layer part 18 is then joggled in the opposite direction at 24. The joggled edge 19 of the other reinforcing metal-layer part 17 is arranged on the edge 20 of the reinforcing metal-layer part 18 and, in addition, the overlapping edges 19, 20 are located on the left-hand side of the joining region 2.

Figure 19:
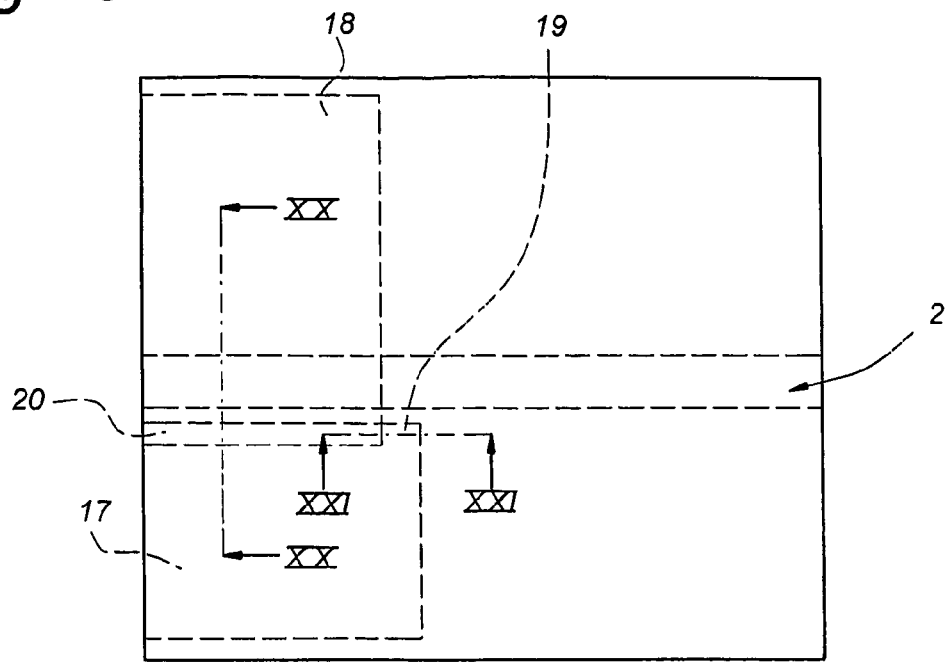
Figure 20:
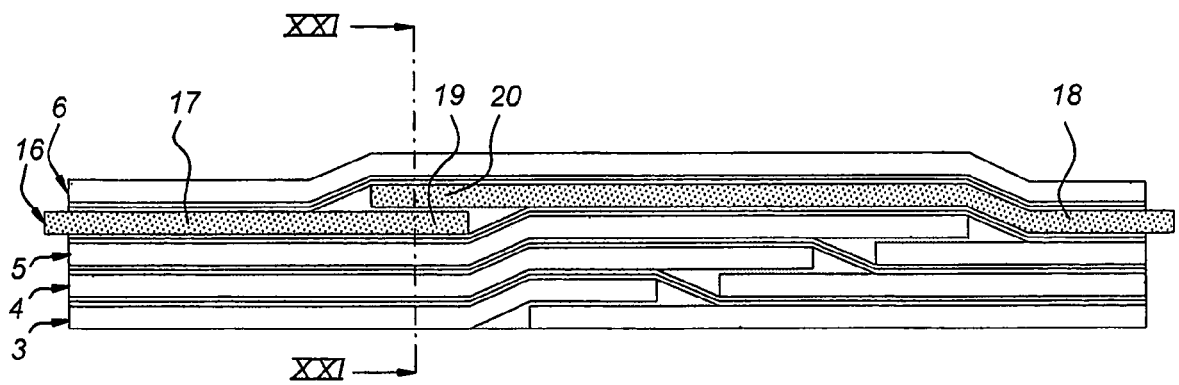
Figure 21:
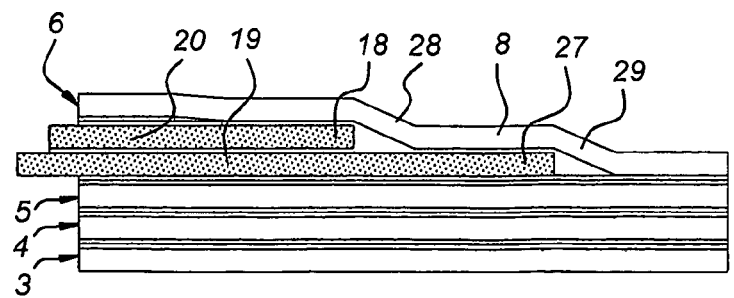

The variant of FIGS. 19-21 corresponds to a large degree to that of FIGS. 13 to 15, except that in this case the reinforcing metal-layer part 17 extends further than the reinforcing metal-layer part 18, as is illustrated in the plan view of FIG. 19.

Figure 22:
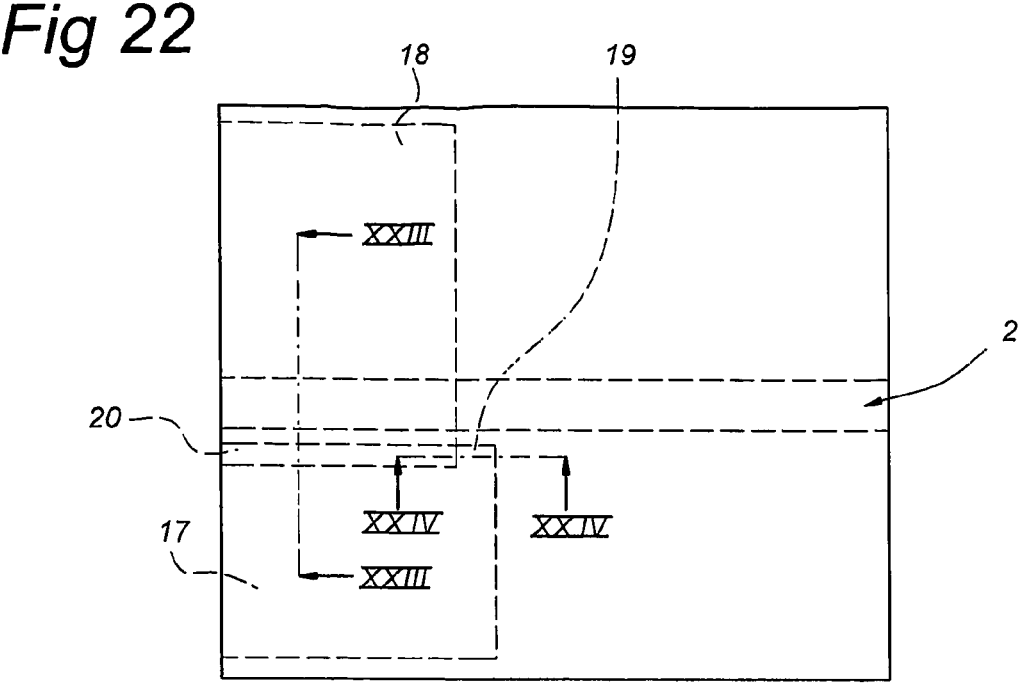
Figure 23:
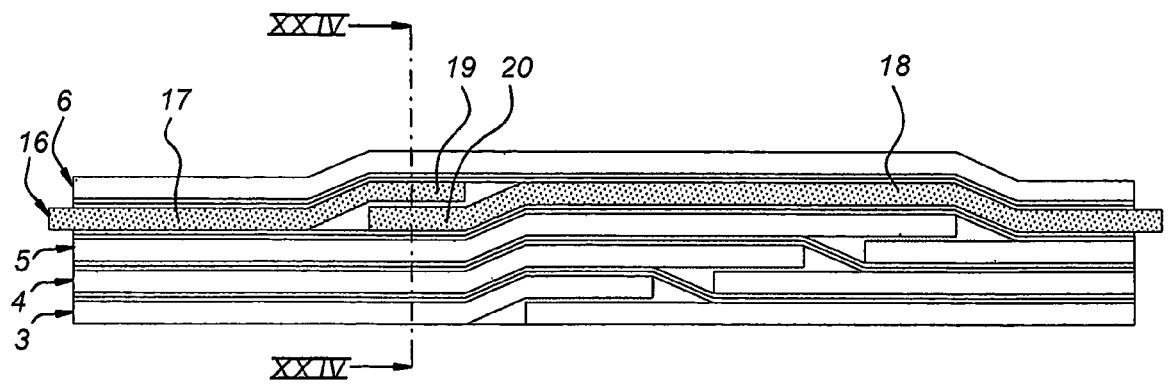
Figure 24:
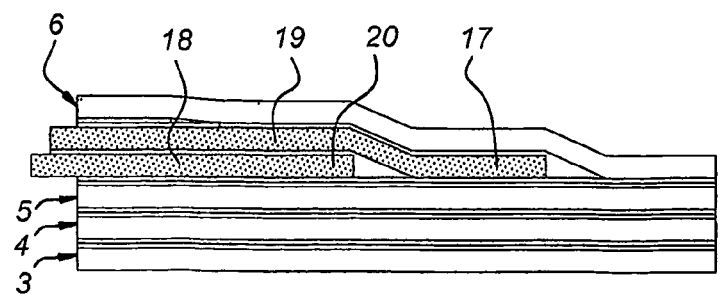

In this way, the variant of FIGS. 22 to 24 corresponds to that of FIGS. 16 to 18: in this case the reinforcing metal-layer part 1S also extends less far than the reinforcing metal-layer part 17.

Figure 25:
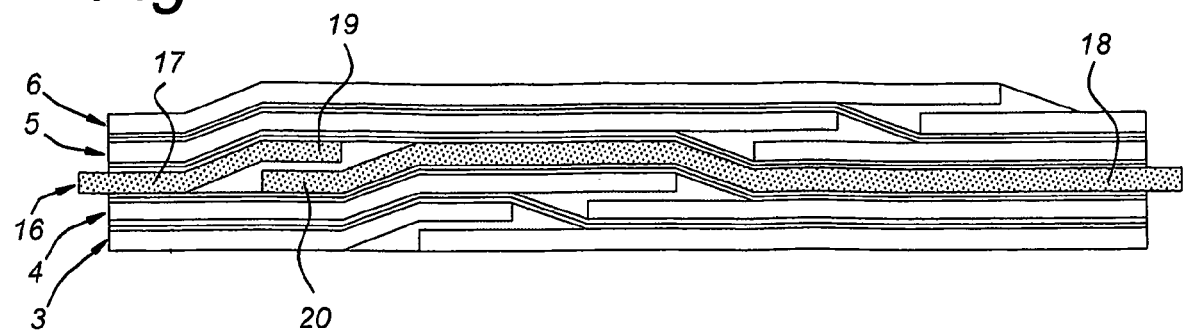
FIGS. 25 and 26 show alternatives for the position of the reinforcing metal-layer parts.
Figure 26:
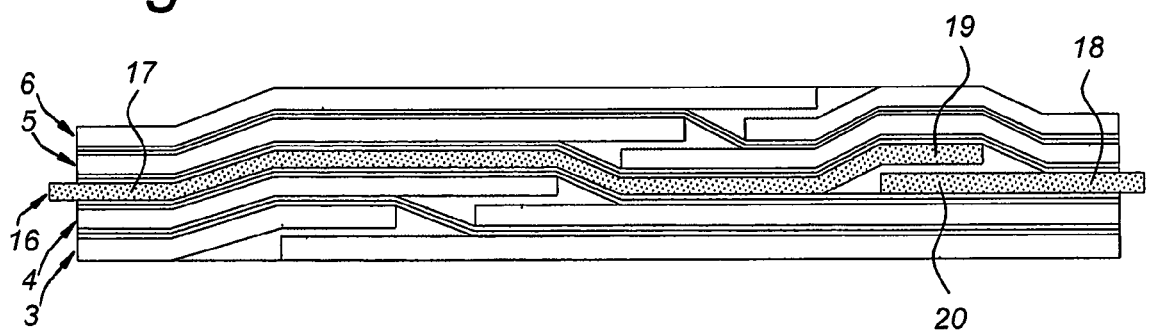

FIGS. 25 and 26 illustrate that the reinforcing metal-layer parts 17 and 18 may be situated at any location in the thickness between the metal layers 3, 4, 5 and 6.

The invention claimed is:

1. A joining structure in a laminate comprising:
   a plurality of metal layers; and
   at least one adhesive layer which is enclosed by the plurality of metal layers said plurality of metal layers each comprise separate metal-layer parts having a first pair of overlapping edges, said first pairs of edges are offset with respect to each other and together define a continuous joining region,
   a first section of said laminate is of standard construction and a second section of said laminate contains an additional, internal reinforcing metal layer, said reinforcing metal layer comprising two reinforcing metal-layer parts with a second pair of overlapping edges, said second pair of edges being located outside the joining region.

2. The joining structure as claimed in claim 1, wherein each of the plurality of metal layers has a metal-layer part with a joggled edge in such a manner that the metal-layer parts are substantially in line with one another.

3. The joining structure as claimed in claim 2, wherein one of said reinforcing metal-layer parts is joggled over the joggled edge of the joggled metal layer part to form a joggled portion.

4. The joining structure as claimed in claim 3, wherein the joggled portion of said one of the reinforcing metal-layer parts is then joggled in the opposite direction towards the other, associated metal-layer part to form a second joggled portion.

5. The joining structure as claimed in claim 4, wherein said one of the reinforcing metal-layer parts is subsequently joggled in the same direction as said joggled edge of the joggled metal-layer part over another one of said reinforcing metal-layer parts to form a third joggled portion or joggled edge.

6. The joining structure as claimed in claim 5, wherein a metal-layer part of a further metal layer extends over the portion, joggled in the opposite direction, of the first one of reinforcing metal-layer parts to form a spacing between the edge of the metal-layer part of the further metal layer and the portion, joggled in the opposite direction, of the first one of reinforcing metal-layer parts, in such a manner that the edge of another metal-layer part of the further metal layer extends as far as the region where said spacing occurs.

7. The joining structure as claimed in claim 6, wherein the other metal-layer part is joggled, from the region where said spacing occurs, over the edge of the reinforcing metal-layer part joggled in the same direction, and is then joggled in the opposite direction.

8. The joining structure as claimed in claim 1, wherein the first and second pairs of edges, in the direction transverse to the direction in which the first and second pairs of edges overlap, are of different sizes in order to provide a stepped joggle arrangement of the metal layer covering the reinforcing metal-layer parts.

9. The joining structure as claimed in claim 1, wherein each adhesive layer runs on continuously over the first and second parts of overlapping edges.

10. A joining structure in a laminate comprising:
a plurality of metal layers; and
at least one adhesive layer which is enclosed by the plurality of metal layers, said plurality of metal layers each comprise separate metal-layer parts having a first pair of overlapping edges, said first pairs of edges are offset from each each other and immediately adjacent to each other and together define a joining region,
a first section of said laminate is of standard construction and a second section of said laminate contains an additional, internal reinforcing metal layer, said reinforcing metal layer comprising two reinforcing metal-layer parts with a second pair of overlapping edges, said second pair of edges being located outside the joining region.

11. A joining structure and a laminate comprising:
a plurality of metal layers; and
at least one adhesive layer which is enclosed by the plurality of metal layers, said plurality of metal layers each comprise separate metal-layer parts having a first pair of overlapping edges, said first pairs of edges are offset with respect to each other and together define a joining region,
a first section of said laminate is of standard construction and includes said plurality of metal layers, and
a second section of said laminate includes said plurality of metal layers and contains an additional, internal reinforcing metal layer, said reinforcing metal layer comprising two reinforcing metal-layer parts with a second pair of overlapping edges, said second pair of edges being located outside the joining region, said reinforcing metal layer only being within said second section.

* * * * *